United States Patent
Jebara et al.

(10) Patent No.: US 9,607,246 B2
(45) Date of Patent: Mar. 28, 2017

(54) HIGH ACCURACY LEARNING BY BOOSTING WEAK LEARNERS

(71) Applicant: The Trustees of Columbia University in the City of New York, New York, NY (US)

(72) Inventors: Tony Jebara, New York, NY (US); Pannagadatta Shivaswamy, San Mateo, CA (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 326 days.

(21) Appl. No.: 13/953,813

(22) Filed: Jul. 30, 2013

(65) Prior Publication Data
US 2014/0029840 A1    Jan. 30, 2014

Related U.S. Application Data

(60) Provisional application No. 61/677,337, filed on Jul. 30, 2012.

(51) Int. Cl.
G06K 9/62    (2006.01)
G06N 99/00    (2010.01)

(52) U.S. Cl.
CPC ......... *G06K 9/6256* (2013.01); *G06K 9/6257* (2013.01); *G06N 99/005* (2013.01)

(58) Field of Classification Search
CPC ... G06K 9/6256; G06K 9/6257; G06N 99/005
See application file for complete search history.

(56) References Cited

U.S. PATENT DOCUMENTS 7,099,505 B2    8/2006    Li et al.
7,624,076 B2    11/2009   Movellan et al.
(Continued)

OTHER PUBLICATIONS

Shivaswamy, Pannagadatta K., and Tony Jebara. "Empirical bernstein boosting." International Conference on Artificial Intelligence and Statistics. 2010.*

(Continued)

*Primary Examiner* — Kim Vu
*Assistant Examiner* — Michael Vanchy, Jr.
(74) *Attorney, Agent, or Firm* — Potomac Law Group, PLLC; Mark Catan

(57) ABSTRACT

A system, apparatus, method, and computer-readable medium for optimizing classifiers are disclosed. The optimization process can include receiving one or more training examples. The optimization process can further include assigning a loss parameter to each training example. The optimization process can further include optimizing each loss parameter of each training sample based on a sample variance of each training example using a non-linear function. The optimization process can further include estimating a classifier from the one or more weighted training samples. The optimization process can further include assigning a loss parameter to the classifier based on a number of training examples that the classifier correctly classified and a number of training examples that the classifier incorrectly classified. The optimization process can further include adding the weighted classifier to an overall classifier.

19 Claims, 7 Drawing Sheets

(56) References Cited

U.S. PATENT DOCUMENTS

| | | | |
|---|---|---|---|
| 8,315,465 B1* | 11/2012 | Baluja | G06K 9/00456 382/156 |
| 2007/0233435 A1* | 10/2007 | Bradski | G06F 17/18 703/2 |
| 2008/0195577 A1* | 8/2008 | Fan et al. | 707/2 |
| 2010/0153315 A1 | 6/2010 | Gao et al. | |

OTHER PUBLICATIONS

P. Shivaswamy and T. Jebara. "Variance Penalizing AdaBoost". Neural Information Processing Systems (NIPS), Dec. 2011.

Khuri, Natalia, "Operon Prediction with Bayesian Classifiers", (2007), Master's Projects, Paper 128.

Jean-Yves Audibert et al., "Tuning bandit algorithms in stochastic environments", Author manuscript, published in "Algorithmic Learning Theory, Sendai: Japan (2007)".

Peter L. Bartlett et al., "Convexity, Classification, and Risk Bounds", Journal of the American Statistical Association, vol. 101, No. 473, Theory and Methods, Mar. 2006.

Roman Timofeev, "Classification and Regression Trees (CART) Theory and Applications", A Master Thesis Presented, CASE—Center of Applied Statistics and Economics, Dec. 20, 2004.

Yoav Freund et al., "A decision-theoretic generalization of on-line learning and an application to boosting", Journal of Computer and System Sciences, 55(1):119-139, 1997.

Andreas Maurer et al., "Empirical Bernstein Bounds and Sample Variance Penalization", In COLT, 2009.

Volodymyr Mnih et al., "Empirical Bernstein Stopping", In COLT, 2008.

G. Rätsch et al., "Soft Margins for AdaBoost", Machine Learning, 42, 287-320, 2001.

Lev Reyzin et al., "How Boosting the Margin Can Also Boost Classifier Complexity", In ICML, 2006.

Robert E. Schapire et al., "Boosting the Margin: A New Explanation for the Effectiveness of Voting Methods", The Annals of Statistics, 26(5): 1651-1686, 1998.

Pannagadatta K. Schivaswamy et al., "Empirical Bernstein Boosting", In AISTATS, 2010.

Olivier Bousquet et al., "Introduction to Statistical Learning Theory", Lecture Notes in Artificial Intelligence, 3176:169-207, 2004.

Schapire et al., "Boosting Foundations and Algorithms", The MIT Press, May 2013, Cambridge, MA (Overview/TOC).

Schapire, "The Boosting Approach to Machine Learning An Overview", Book Chapter in Nonlinear Estimation and classification, (Dec. 19, 2001), Springer-Verlag New York.

* cited by examiner

HIGH ACCURACY LEARNING BY BOOSTING WEAK LEARNERS

CROSS-REFERENCE TO RELATED APPLICATIONS

This application claims the benefit of U.S. Provisional Application No. 61/677,377, filed Jul. 30, 2012, the content of which is hereby incorporated by reference in its entirety.

STATEMENT REGARDING FEDERALLY SPONSORED RESEARCH

This invention was made with government support under Contract No. N66001-09-C-0080 awarded by the Department of Homeland Security. The government has certain rights in the invention.

BACKGROUND

Classifiers (i.e., classifiers) are used to automate recognition or classification of data. Classifiers can be simple or complex. A common application of a classifier is in digital image recognition, where an image is presented to a computer implementation of a classifier to identify some object in the image (e.g. a person's face, lines on a road, etc.). Classification has many applications including computer vision, medical imaging (X-ray, magnetic resonance imaging ("MRI")), and face detection. Improvements in the efficiency and accuracy, flexibility for use in varied kinds of classification applications, and speed of generation of classifiers are desirable.

SUMMARY

Embodiments of the disclosed subject matter relate generally to methods, apparatuses, systems, computer programs, computer readable media, and devices that can create and implement classifiers. The methods and devices disclosed relate to boosting. Boosting assembles weak classifiers to form a strong composite classifier whose output is a weighted sum of weaker learners or weak classifiers. In embodiments, a set of weak learners are generated by optimization on respective training data (labeled examples or samples) and combined. In other embodiments, the weak classifiers are selected from a pool and assembled into the composite classifier based on their ability to predict the labels of examples. In Adaboost, weak learners are selected or trained by minimizing the mean value of exponential loss. In the present embodiments, a composite of the variance and mean of the exponential loss is minimized by selection or optimization at each iteration of the boosting process. Further, the exponential loss that is minimized is calculated from the most recent weak learner, rather than the composite of the classifier under construction.

BRIEF DESCRIPTION OF THE DRAWINGS

Embodiments will herein be described in detail below with reference to the accompanying drawings, wherein like reference numerals represent like elements. The accompanying drawings have not necessarily been drawn to scale. Where applicable, some features may not be illustrated to assist in the description of underlying features.

DETAILED DESCRIPTION

Figure 1:
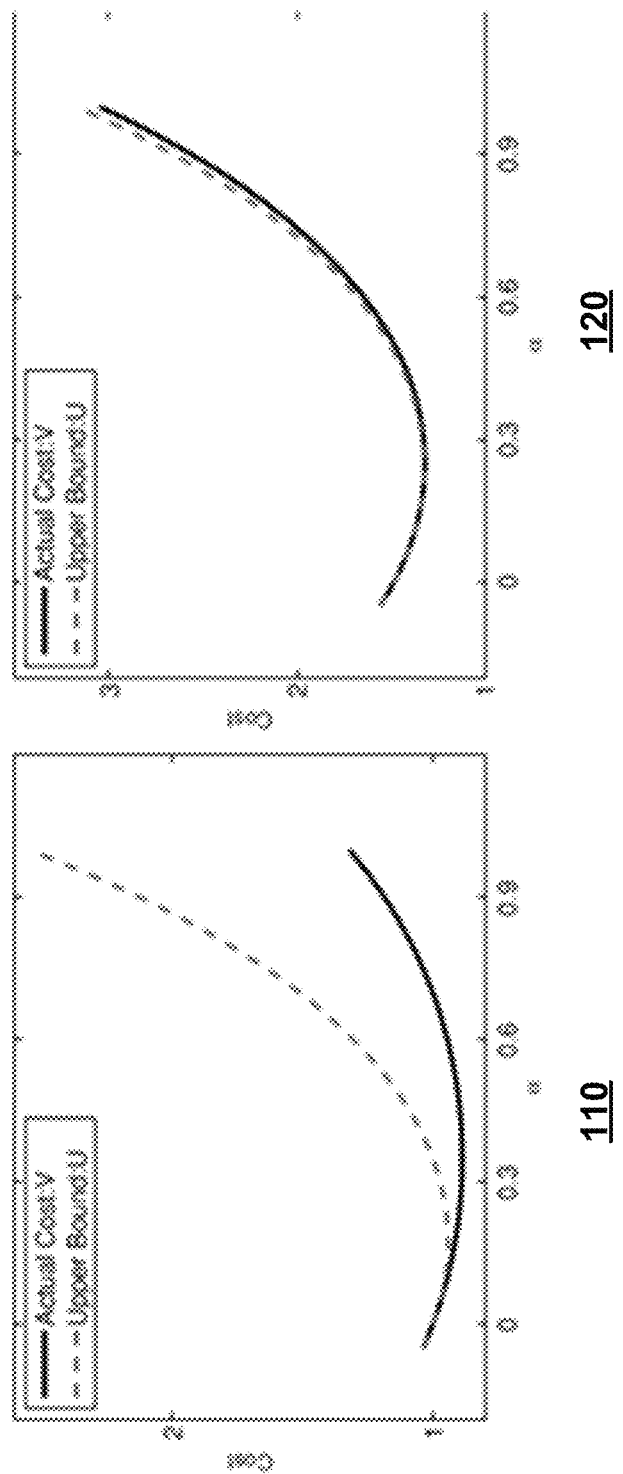
FIG. 1 is a visualization of an upper bound U and an actual cost function V under varying a, according to an embodiment of the invention.

Embodiments of the disclosed subject matter relate generally to classifiers, particular types of classifiers made up of multiple, potentially similar and in embodiments, the same, component classifiers that are optimized or selected responsively to training data and combined to yield a composite classifier. An example composite classifier is a weighted linear sum of the component classifiers or optimized weak learners.

Embodiments relate to a computer-implemented method, apparatus, system, a computer-readable medium, and a computer program product for improving the performance of a classifier by a process called boosting, in which multiple classifiers, optimized using respective training data, are combined to form a new classifier with greater accuracy. The embodiments include methods, apparatus, and systems for generating improved classifiers and for classifying sample inputs using boosted classifiers.

Boosting is a type of machine learning algorithm that works to optimize a classifier. A classifier is any method of analyzing input data that includes one or more elements and appropriately sorting it (or otherwise classifying it). A common application of classification is in digital image recognition, where an image is presented to a program, which must then properly identify the presence of some object in the image (e.g. a person's face, lines on a road, etc.). The general idea behind boosting is that it takes a group of simple, but poor classifiers ("weak learners"), and combines them to form a single classifier with much higher accuracy (a "strong learner"). This is accomplished by iteratively testing classifiers on a set of training data, and weighting the data based on each classifier's efficacy (i.e. how much error there is in identification).

Classifiers are methods for automating the recognition of an applied signal or data, usually one with a lot of dimensions. Classifiers are used in many applications in image processing including computer vision, medical imaging (X-ray, MRI), and face detection. Boosting works by taking many simple but weak classifiers and combining them to form an improved classifier (a composite classifier or a "strong learner"). As in Adaboost, this is accomplished by iteratively testing the weak classifiers on an example set of data. After a given classifier is tested on the data, examples that were improperly identified are given a greater weight for testing with the following classifier; as the algorithm progresses there is a greater focus on identifying examples that previous classifiers have failed on. The weighting of example data is done based on the error in identification; how "wrong" the function was. This leads to an optimized overall classifier.

In Adaboost, the creation of a composite classifier starts with a pool of classifiers or a weak learner and a set of training samples (or training examples). A weak learner is estimated to optimize its ability to estimate the labels on weighted training data. Alternatively, weak classifiers are recruited from the pool by selecting the best one at estimating labels on weighted training data. From hereon, the discussion will assume weak classifiers are optimized (estimated) based on the weighted labeled training data, but it will be recognized that the same embodiments discussed below can be performed using a selection from a pool rather than by the optimization of a weak learner. Still further embodiments may include the selection from a pool and optimization of learners both in a single derivation of a classifier.

According to embodiments of the invention, weak learners that achieve slightly better than random guessing on a classification problem are combined to create a strong learner which can label examples much better than random, for instance, achieve a performance that is arbitrarily well-correlated with the true classification. In the embodiments, a boosting algorithm is performed in a way that improves on existing algorithms by improving classification accuracy without adding significant complexity over prior art methods. According to embodiments iteratively minimizes a cost function that balances the sample mean and the sample variance of the exponential loss at each step of construction of a strong classifier. This provides better performance (stronger statistical guarantees) and has been demonstrated in practice. According to embodiments, the method can improve on Adaboost in terms of classification performance on standard benchmarks.

Further, in certain embodiments, the method may be incorporated in a variation of Adaboost which is used in many pattern recognition technologies and can therefore be used to upgrade these applications. Example applications include face detection such as the Viola-Jones boosted cascade (developed by Mitsubishi Electric Research Labs) which is used in commercial camera technologies for automatic focusing on faces in commercial camera systems. Other vision systems have similarly used Adaboost to perform visual object detection and recognition (for security applications, land mine detection, document analysis, digit recognition, detecting pedestrians in automatic vehicle driving assistance technology, medical imaging and so on). Commercially viable examples include AT&T's use of Adaboost for fraud detection in their land-line billing system. In any application where accuracy is important, utilization of the disclosed method can result in a significant improvement without any significant implementation difficulties.

Disclosed methods may provide weighted data to a weak learner without requiring, at each step, evaluation of all the weak learners. Thus, the disclosed methods are different from empirical Bernstein boosting methods which require brute force enumeration of all possible weak learners. Experimental results confirm that the methods achieve the performance improvements of the "EBBoost" algorithm, yet goes beyond decision stumps to handle any weak learner. Significant performance gains are obtained over AdaBoost for arbitrary weak learners including decision trees ("CART").

Many machine learning algorithms implement empirical risk minimization or a regularized variant of it. For example, the AdaBoost algorithm minimizes exponential loss on the training examples. Similarly, the support vector machine minimizes hinge loss on the training examples. The convexity of these losses is helpful for computational as well as generalization reasons. The goal of most learning problems, however, is not to obtain a function that performs well on training data, but rather to estimate a function (using training data) that performs well on future unseen test data. Therefore, empirical risk minimization on the training set is often performed while regularizing the complexity of the function classes being explored. The rationale behind this regularization approach is that it ensures that the empirical risk converges (uniformly) to the true unknown risk. Various concentration inequalities formalize the rate of convergence in terms of the function class complexity and the number of samples.

A key tool in obtaining such concentration inequalities is Hoeffding's inequality which relates the empirical mean of a bounded random variable to its true mean. Bernstein's and Bennett's inequalities relate the true mean of a random variable to the empirical mean but also incorporate the true variance of the random variable. If the true variance of a random variable is small, these bounds can be significantly tighter than Hoeffding's bound. The presently-described embodiments employ an alternative to empircal risk minimization, which may be called sample variance penalization. According to embodiments, the disclosed methods implement sample variance penalization. The methods minimize the empirical risk on the training set as well as the empirical variance, or put differently, it minimizes a parameter that balances the risk and variance. The two quantities (the risk and the variance) may be traded-off through a scalar parameter ($\lambda$). Moreover, as mentioned, the methods do not require exhaustive enumeration of the weak learners.

Assume that a training set $(X_i, y_i)_{i=1}^n$ is provided where $X_i \in X$ and $y_i \in \{\pm 1\}$ are drawn independently and identically distributed (iid) from a fixed but unknown distribution D. The goal is to learn a classifier or a function $f: X \rightarrow \{\pm 1\}$ that performs well on test examples drawn from the same distribution D. $G: X \rightarrow \{\pm 1\}$ denotes the so-called weak learner. The notation $G^s$ denotes the weak learner in a particular iteration s. Further, the two indices sets $I_s$ and $J_s$, respectively, denote examples that the weak learner $G^s$ correctly classified and misclassified, i.e., $I_s := \{i | G^s(X_i) = y_i\}$ and $J_s := \{j | G^s(X_j) \neq y_j\}$.

To compare an embodiment of the current methods to Adaboost, the Adaboost algorithm and an embodiment of the disclosed methods are described in pseudocode below and following that, pseudocode for an embodiment of the disclosed subject matter identified as Vadaboost (for Variance-Penalizing Adaboost).

---

AdaBoost Algorithm

Require: $(X_i, y_i)_{i=1}^n$, and weak learners H
    Initialize the weights: $w_i \leftarrow 1/n$ for i 1, ... , n; Initialize f to predict zero on all inputs.
    for $s \leftarrow 1$ to S do
        Estimate a weak learner $G^s(\cdot)$ from training examples weighted by
        $(w_i)_{i=1}^n$.

$$\alpha_s = \frac{1}{2} \log \left( \sum_{i: G^s(X_i) = y_i} w_i \bigg/ \sum_{j: G^s(X_j) \neq y_j} w_j \right)$$

if $\alpha_s \leq 0$ then
            break
        end if

-continued

```
     f(·) ← f(·) α_s G^s (·)
     w_i ← w_i exp (−y_i G^s (X_i) α_s)/Z_s where Z_s is such that Σ_{i=1}^n w_i = 1.
   end for
Vadaboost method
```

Require: $(X_i, y_i)_{i=1}^n$, scalar parameter $1 \geq \lambda \geq 0$, and weak learners H
  Initialize the loss parameters: $w_i \leftarrow 1/n$ for $i = 1, \ldots, n$; Initialize f to
    predict zero on all inputs.
    for $s \leftarrow 1$ to S do
      $u_i \leftarrow \lambda n w_i^2 + (1-\lambda) w_i$
      Estimate a weak learner $G^s(\cdot)$ from training examples weighted by
        $(u_i)_{i=1}^n$.
      $\alpha_s = \frac{1}{4} \log \left( \sum_{i:G^s(X_i)=y_i} u_i \Big/ \sum_{j:G^s(X_j) \neq y_j} u_j \right)$
      if $\alpha_s \leq 0$ then
        break
      end if
      $f(\cdot) \leftarrow f(\cdot) + \alpha_s G^s(\cdot)$
      $w_i \leftarrow w_i \exp(-y_i G^s(X_i) \alpha_s)/Z_s$ where $Z_s$ is such that $\Sigma_{i=1}^n w_i = 1$.
    end for The AdaBoost algorithm assigns a weight $w_i$ to each training example. In each step of the AdaBoost algorithm, a weak learner $G^s(\cdot)$ is obtained on the weighted examples and a coefficient $\alpha_s$ is assigned to it. Thus, the AdaBoost algorithm iteratively builds $\Sigma_{s=1}^s \alpha_s G^s(\cdot)$. If a training example is correctly classified, its weight is exponentially decreased; if it is misclassified, its weight is exponentially increased. The process is repeated until a stopping criterion is met. The AdaBoost algorithm essentially performs empirical risk minimization:

$$\min_{f \in F} \left( \frac{1}{n} \sum_{i=1}^n e^{-y_i f(X_i)} \right)$$

by greedily constructing the function $f(\cdot)$ via $\Sigma_{s=1}^S \alpha_s G^s(\cdot)$.

The alternative to empirical risk minimization embodied in the Vadaboost embodiment, which may be identified as sample variance penalization, trades-off the empirical risk with the empirical variance:

$$\arg\min_{f \in F} \frac{1}{n} \sum_{i=1}^n l(f(X_i), y_i) + \tau \sqrt{\frac{\hat{V}[l(f(X), y)]}{n}}$$

where $\tau \geq 0$ explores the trade-off between the two quantities. The motivation for sample variance penalization comes from the following theorem:

Theorem 1:

Let $(X_i, y_i)_{i=1}^n$ be drawn iid from a distribution D. Let F be a class of functions $f: X \to \mathbb{R}$. Then, for a loss $l: \mathbb{R} \times Y \to [0,1]$, for any $\delta > 0$, w.p. at least $1-\delta$, $\forall f \in F$ $$E[l(f(X), y)] \leq \frac{1}{n} \sum_{i=1}^n l(f(X_i), y_i) + \frac{15 \ln(M(n)/\delta)}{(n-1)} + \sqrt{\frac{18 \hat{V}[l(f(X), y)] \ln(M(n)/\delta)}{n}},$$

where $M(n)$ is a complexity measure.

From the above uniform convergence result, it can be argued that future loss can be minimized by minimizing the right hand side of the bound on training examples. Since the variance $\hat{V}[l(f(X), y)]$ has a multiplicative factor involving $M(n)$, $\delta$ and $n$, for a given problem, it is difficult to specify the relative importance between empirical risk and empirical variance a priori. Hence, sample variance penalization necessarily involves a trade-off parameter $\tau$.

Empirical risk minimization or sample variance penalization on the 0-1 loss is a hard problem; this problem is often circumvented by minimizing a convex upper bound on the 0-1 loss. For example, one can consider the exponential loss $l(f(X), y) := e^{-y \cdot f(x)}$. With the above loss, variance penalization is equivalent to minimizing the following cost, $$\left( \sum_{i=1}^n e^{-y_i f(X_i)} \right)^2 + \lambda \left( n \sum_{i=1}^n e^{-2 y_i f(X_i)} - \left( \sum_{i=1}^n e^{-y_i f(X_i)} \right)^2 \right).$$

Theorem 1 requires that the loss function to be bounded. Even though the exponential loss is unbounded, boosting is typically performed only for a finite number of iterations in most practical applications. Moreover, since weak learners typically perform only slightly better than random guessing, each $\alpha_s$ in the AdaBoost algorithm (or in the Vadaboost method) is typically small thus limiting the range of the function learned. Furthermore, experiments will confirm that sample variance penalization results in a significant empirical performance improvement over empirical risk minimization.

The Vadaboost method iteratively performs sample variance penalization (i.e., it minimizes the cost iteratively). According to an embodiment, the Vadaboost method can share the simplicity and ease of implementation found in the AdaBoost algorithm.

In the $s^{th}$ iteration, an objective is to choose a weak learner $G^s$ and a coefficient $\alpha_s$ such that $\Sigma_{t=1}^s \alpha_t G^t(\cdot)$ reduces the cost. Denote by $w_i$ the quantity $e^{-y_i \Sigma_{t=1}^{s-1} \alpha_t G^t(x_i)}/Z^s$. Given a candidate weak learner $G^s(\cdot)$, the cost for the function $\Sigma_{t=1}^{s-1} \alpha_t G^t(\cdot)$ can be expressed as a function of $\alpha$:

$$V(\alpha; w, \lambda, I, J) := \left( \sum_{i \in I} w_i e^{-\alpha} + \sum_{j \in J} w_j e^{\alpha} \right)^2 +$$

$$\lambda \left( n \sum_{i \in I} w_i^2 e^{-2\alpha} + n \sum_{j \in J} w_j^2 e^{2\alpha} - \left( \sum_{i \in I} w_i e^{-\alpha} + \sum_{j \in J} w_j e^{\alpha} \right)^2 \right)$$

up to a multiplicative factor.

In the quantity above, I and J are the two index sets (of correctly classified and incorrectly classified examples) over $G^s$. Let the vector w whose $i^{th}$ component is $w_i$ denote the current set of weights on the training examples. Here, the subscripts/superscripts s have been dropped for brevity.

Lemma 2:

The update of $\alpha_s$ in the algorithm minimizes the cost $$U(\alpha; w, \lambda, I, J) := \left( \sum_{i \in I} (\lambda n w_i^2 + (1-\lambda) w_i) \right) e^{-2\alpha} + \left( \sum_{j \in J} (\lambda n w_j^2 + (1-\lambda) w_j) \right) e^{2\alpha}.$$

Proof:

By obtaining the second derivative of the above expression (with respect to $\alpha$), it is easy to see that it is convex in α. Thus, setting the derivative with respect to a to zero gives the optimal choice of α as shown in the Vadaboost method.

Theorem 3:

Assume that $0 \leq \lambda \leq 1$ and $\Sigma_{i=1}^n w_i = 1$ (i.e. normalized loss parameters). Then, $V(\alpha; w, \lambda, I, J) \leq U(\alpha; w, \lambda, I, J)$ and $V(0; w, \lambda, I, J) = U(0; w, \lambda, I, J)$. That is, U is an upper bound on V and the bound is exact at $\alpha=0$.

Proof:

Denoting $1-\lambda$ by $\bar{\lambda}$, the following is produced:

$$V(\alpha; w, \lambda, I, J) := \left(\sum_{i \in I} w_i e^{-\alpha} + \sum_{j \in J} w_j e^{\alpha}\right)^2 +$$

$$\lambda\left(n\sum_{i \in I} w_i^2 e^{-2\alpha} + n\sum_{j \in J} w_j^2 e^{2\alpha} - \left(\sum_{i \in I} w_i e^{-\alpha} + \sum_{j \in J} w_j e^{\alpha}\right)^2\right) =$$

$$\bar{\lambda}\left(\sum_{i \in I} w_i e^{-\alpha} + \sum_{j \in J} w_j e^{\alpha}\right)^2 + \lambda\left(n\sum_{i \in I} w_i^2 e^{-2\alpha} + n\sum_{j \in J} w_j^2 e^{2\alpha}\right) =$$

$$\lambda\left(n\sum_{i \in I} w_i^2 e^{-2\alpha} + n\sum_{j \in J} w_j^2 e^{2\alpha}\right) +$$

$$\bar{\lambda}\left(\left(\sum_{i \in I} w_i\right)^2 e^{-2\alpha} + \left(\sum_{j \in J} w_j\right)^2 e^{2\alpha} + 2\left(\sum_{i \in I} w_i\right)\left(\sum_{j \in J} w_j\right)\right) =$$

$$\lambda\left(n\sum_{i \in I} w_i^2 e^{-2\alpha} + n\sum_{j \in J} w_j^2 e^{2\alpha}\right) + \bar{\lambda}\left(\left(\sum_{i \in I} w_i\right)\left(1 - \sum_{j \in J} w_j\right)e^{-2\alpha} + \left(\sum_{j \in J} w_j\right)\left(1 - \sum_{i \in I} w_i\right)e^{2\alpha}\right) + 2\bar{\lambda}\left(\sum_{i \in I} w_i\right)\left(\sum_{j \in J} w_j\right) =$$

$$\left(\sum_{i \in I}(\lambda n w_i^2 + \bar{\lambda} w_i)\right)e^{-2\alpha} + \left(\sum_{j \in J}(\lambda n w_j^2 + \bar{\lambda} w_j)\right)e^{2\alpha} +$$

$$\bar{\lambda}\left(\sum_{i \in I} w_i\right)\left(\sum_{j \in J} w_j\right)(-e^{2\alpha} - e^{-2\alpha} + 2) \leq \left(\sum_{i \in I}(\lambda n w_i^2 + \bar{\lambda} w_i)\right)e^{-2\alpha} + \left(\sum_{j \in J}(\lambda n w_j^2 + \bar{\lambda} w_j)\right)e^{2\alpha} = U(\alpha; w, \lambda, I, J).$$

In the aforementioned proof, terms were simply regrouped. Further, the square term was expanded. Furthermore, the fact that $\Sigma_{i \in I} w_i + \Sigma_{j \in J} w_j = \Sigma_{i=1}^n w_i = 1$ was used in the proof. Additionally, terms were once again regrouped; the last term in this expression (which is $e^{2\alpha} + e^{-2\alpha} - 2$) can be written as $(e^\alpha - e^{-\alpha})^2$. When $\alpha=0$ this term vanishes. Hence the bound is exact at $\alpha=0$.

Corollary 4:

VadaBoost monotonically decreases the cost.

The above corollary follows from:

$$V(\alpha_s; w, \lambda, I, J) \leq U(\alpha_s; w, \lambda, I, J) < U(0; w, \lambda, I, J) = V(0; w, \lambda, I, J).$$

In the above, the first inequality follows from Theorem 3. The second strict inequality holds because $\alpha_s$ is a minimizer of U from Lemma 2; it is not hard to show that $U(\alpha_s; w, \lambda, I, J)$ is strictly less than $U(0; w, \lambda, I, J)$ from the termination criterion of VadaBoost. The third equality again follows from Theorem 3. Finally, $V(0; w, \lambda, I, J)$ merely corresponds to the cost at $\Sigma_{t=1}^{s-1} \alpha_t G^t(\cdot)$. Thus, it is shown shown that taking a step $\alpha_s$ decreases the cost.

In certain embodiments, a different upper bound can be used in each iteration since V and U are parameterized by the current weights in the Vadaboost method. Also note that the upper bound holds only for $0 \leq \lambda \leq 1$. Although the choice $0 \leq \lambda \leq 1$ seems restrictive, intuitively, it is natural to have a higher penalization on the empirical mean rather than the empirical variance during minimization. Also, a closer look at the empirical Bernstein inequality shows that the empirical variance term is multiplied by $\sqrt{1/n}$ while the empirical mean is multiplied by one. Thus, for large values of n, the weight on the sample variance is small. Furthermore, experiments that were conducted suggest that restricting $\lambda$ to this range does not significantly change the results.

First, it can be observed that the upper bound is exact when $\lambda=1$. Also, the upper bound is loosest for the case $\lambda=0$. To visualize the upper bound, it is plotted alongside the true cost for two settings of $\lambda$ as described below in conjunction with FIG. 1.

FIG. 1 is a visualization of an upper bound $U(\alpha; w, \lambda, I, J)$ and an actual cost function $V(\alpha; w, \lambda, I, J)$ under varying a, according to an embodiment of the invention. More specifically, plot 110 shows the bound for $\lambda=0$, and plot 120 shows the bound for $\lambda=0.9$. The bound is exact at $\alpha=0$.

Since the cost is minimized via an upper bound, a natural question is: how good is this approximation? The tightness of this upper bound can be evaluated by considering its impact on learning efficiency. As is clear from FIG. 1, when $\lambda=1$, the upper bound is exact and incurs no inefficiency. In the other extreme when $\lambda=0$, the cost of the Vadaboost method coincides with the AdaBoost algorithm and the bound is effectively at its loosest. Even in this extreme case, the Vadaboost method derived through an upper bound only requires at most twice the number of iterations as the AdaBoost algorithm to achieve a particular cost. Thus, the following theorem shows that the novel Vadaboost method remains efficient even in this worst-case scenario.

Theorem 5:

Let $O_A$ denote the squared cost obtained by the AdaBoost algorithm after S iterations. For weak learners in any iteration achieving a fixed error rate $\epsilon < 0.5$, the VadaBoost algorithm with the setting $\lambda=0$ attains a cost at least as low as $O_A$ in no more than 2S iterations.

Proof: Denote the weight on the example i in $s^{th}$ iteration by $w_i^s$. The weighted error rate of the $s^{th}$ classifier is $\epsilon_s = \Sigma_{j \in J_s} w_j^s$. For both algorithms, the following can be produced:

$$w_i^{s+1} = \frac{w_i^s \exp(-y_i \alpha_s G^s(X_i))}{Z_s} = \frac{\exp\left(-y_i \sum_{s=1}^S \alpha_s G^s(X_i)\right)}{n \prod_{s=1}^S Z_s}.$$

The value of the normalization factor in the case of the AdaBoost algorithm is $$Z_s^a = \sum_{j \in J_s} w_j^s e^{\alpha_s} + \sum_{i \in I_s} w_i^s e^{-\alpha_s} = 2\sqrt{\epsilon_s(1-\epsilon_s)}.$$

Similarly, the value of the normalization factor for the Vadaboost method is given by $$Z_s^v = \sum_{j \in J_s} w_j^s e^{\alpha_s} + \sum_{i \in I_s} w_i^s e^{-\alpha_s} = (\epsilon_s(1-\epsilon_s))^{\frac{1}{4}}(\sqrt{\epsilon_s} + \sqrt{1-\epsilon_s}).$$

The squared cost function of the algorithm AdaBoost after S steps is given by $$O_A = \left(\sum_{i=1}^n \exp\left(-y_i \sum_{s=1}^S \alpha_s y_i G^s(X)\right)\right)^2$$

-continued $$= \left(n \prod_{s=1}^{S} Z_s^a \sum_{i=1}^{n} w_i^{s+1}\right)^2$$

$$= n^2 \left(\prod_{s=1}^{S} Z_s^a\right)^2$$

$$= n^2 \prod_{s=1}^{S} 4\varepsilon_s(1-\varepsilon_s).$$

The aforementioned theorem and the value of the normalization factor and the fact that $\Sigma_{i=1}^{n} w_i^{S+1} = 1$ can be used to derive the above expression. Similarly, for $\lambda = 0$ the cost of the Vadaboost method satisfies $$O_V = \left(\sum_{i=1}^{n} \exp\left(-y_i \sum_{s=1}^{S} \alpha_s y_i G^s(X)\right)\right)^2$$

$$= \left(n \prod_{s=1}^{S} Z_s^a \sum_{i=1}^{n} w_i^{s+1}\right)^2$$

$$= n^2 \left(\prod_{s=1}^{S} Z_s^v\right)^2$$

$$= n^2 \prod_{s=1}^{S} \left(2\varepsilon_s(1-\varepsilon_s) + \sqrt{\varepsilon_s(1-\varepsilon_s)}\right).$$

Since the cost which the Vadaboost method minimizes at $\lambda=0$ is the squared cost of AdaBoost, the cost is not squared again.

Now, suppose that $\varepsilon_s = \varepsilon$ for all s. Then, the squared cost achieved by the AdaBoost algorithm is given by $n^2(4\varepsilon(1-\varepsilon))^S$. To achieve the same cost value, the Vadaboost method, with weak learners with the same error rate needs at most $$S \frac{\log(4\varepsilon(1-\varepsilon))}{\log(2\varepsilon(1-\varepsilon) + \sqrt{\varepsilon(1-\varepsilon)})}$$

times. Within the range of interest for $\varepsilon$, the term multiplying S above is at most 2.

Although the above worst-case bound achieves a factor of two, for $\varepsilon > 0.4$, the Vadaboost method requires only about 33% more iterations than the AdaBoost algorithm. To summarize, even in the worst possible scenario where $\lambda=0$ (when the variational bound is at its loosest), the Vadaboost method takes no more than double (a small constant factor) the number of iterations of the AdaBoost algorithm to achieve the same cost.

The Vadaboost method utilizes the non-linear function, $\lambda n w_i^2 + (1-\lambda)w_i$, to optimize one or more weights for one or more training examples, where $w_i$ represents a cumulative loss parameter of a training sample, n represents a number of the one or more loss parameters of the one or more training examples, and represents a scalar parameter from a range of 0 to 1. In alternate embodiments, variations of the Vadaboost method utilizes other non-linear functions to optimize the one or more loss parameters for the one or more training examples. Examples of other non-linear functions are:

Select all $w_i$ below a threshold and set $u_i$ to the remaining values $u_i \lambda n w_j^2 + (1-\lambda)w_j$.

Min($\lambda n w_i^2 + (1-\lambda)w_i$, K) taking the minimum of the Vadaboost loss parameter and a predetermined constant clips extreme values of $w_i$.

Max($\lambda n w_i^2 + (1-\lambda)w_i$, K) taking the maximum of the Vadaboost loss parameter and a predetermined constant clips extreme values of $w_i$.

The cost function can be varied according to known methods and used in place of exponential loss as the basis for updating the loss parameters $w_i$.

A sample variance penalization algorithm, identified as "EBBoost" algorithm was previously explored. An example of the EBBoost algorithm is described below:

---

EBBoost Algorithm

Require: $(X_i, y_i)_{i=1}^n$, scalar parameter $\lambda \geq 0$, weak learners H Initialize the weights: $w_i \leftarrow \frac{1}{n}$; initialize f to predict zero on all inputs.

for s ← 1 to S do
Get a weak learner $G^s(\cdot)$ that minimizes cost with the following choice of $\alpha_s$:

$$\alpha_s = \frac{1}{4} \log \left( \frac{(1-\lambda)\left(\sum_{i \in I_s} w_i\right)^2 + \lambda n \sum_{i \in I_s} w_i^2}{(1-\lambda)\left(\sum_{i \in J_s} w_i\right)^2 + \lambda n \sum_{i \in J_s} w_i^2} \right)$$

if $\alpha_s < 0$ then break end if
$f(\cdot) \leftarrow f(\cdot) + \alpha_s G^s(\cdot)$
$w_i \leftarrow w_i \exp(-y_i G^s(X_i)\alpha_s)/Z_s$ where $Z_s$ is such that $\Sigma_{i=1}^n w_i = 1$.
end for

---

While the EBBoost algorithm was simple to implement and showed significant improvements over the AdaBoost algorithm, it suffers from a severe limitation: it requires enumeration and evaluation of every possible weak learner per iteration. Recall the steps implementing the aforementioned EBBoost algorithm. An implementation of the EBBoost algorithm requires exhaustive enumeration of weak learners in search of the one that minimizes cost. It is preferable, instead, to find the best weak learner by providing weights on the training examples and efficiently computing the rule whose performance on that weighted set of examples is guaranteed to be better than random guessing. However, with the EBBoost algorithm, the weight on all the misclassified examples is $\Sigma_{i \in J_s} w_i^2 + (\Sigma_{i \in J_s} w_i)^2$ and the weight on correctly classified examples is $\Sigma_{i \in I_s} w_i^2 + (\Sigma_{i \in I_s} w_i)^2$; these aggregate weights on misclassified examples and correctly classified examples do not translate into weights on the individual examples. Thus, it becomes necessary to exhaustively enumerate weak learners in the EBBoost algorithm. While enumeration of weak learners is possible in the case of decision stumps, it poses serious difficulties in the case of weak learners such as decision trees, ridge regression, etc. Thus, VadaBoost and its variants is the more versatile boosting algorithm for sample variance penalization, according to embodiments of the invention, as the disclosed methods can avoid the exhaustive enumeration of weak learners observed in the EBBoost algorithm.

The empirical performance of the Vadaboost method was evaluated with respect to several other algorithms. More specifically, the Vadaboost method was compared against the EBBoost algorithm, the AdaBoost algorithm, regularized linear programming ("LP") algorithms, and quadratic programming ("QP") boost algorithms. All the algorithms except the AdaBoost algorithm have one extra parameter to tune. The primary purpose of the experiments was to compare sample variance penalization versus empirical risk minimization and to show that the Vadaboost method can efficiently perform sample variance penalization for weak learners beyond decision stumps.

Experiments were performed on benchmark datasets that have been previously used. These datasets include a variety of tasks including all digits from the MNIST dataset. Each dataset was divided into three parts: 50% for training, 25% for validation and 25% for test. The total number of examples was restricted to 5000 in the case of MNIST and musk datasets due to computational restrictions of solving LP/QP.

The first set of experiments use decision stumps as the weak learners. The second set of experiments used Classification and Regression Trees, or CART, as weak learners. A standard MATLAB implementation of CART was used without modification. For all the datasets, in both experiments, the AdaBoost algorithm, the Vadaboost method and the EBBoost algorithm (in the case of stumps) were run until there was no drop in the error rate on the validation for the next 100 consecutive iterations. The values of the parameters for the Vadaboost method and the EBBoost algorithm were chosen to minimize the validation error upon termination. The RLP-Boost algorithm and the RQP-Boost algorithm were given the predictions obtained by the AdaBoost algorithm. Their regularization parameter was also chosen to minimize the error rate on the validation set. Once the parameter values were fixed via the validation set, the test set error corresponding to that parameter value was noted. The entire experiment was repeated 50 times by randomly selecting train, test and validation sets. The numbers indicated here are average from these runs.

The results for the decision stump and CART experiments are reported in the following tables, respectively.

| Dataset | Adaboost | EBBoost | VadaBoost | RLP-Boost | RQP-Boost |
| --- | --- | --- | --- | --- | --- |
| a5a | 16.15 ± 0.1 | 16.05 ± 0.1 | 16.22 ± 0.1 | 16.21 ± 0.1 | 16.04 ± 0.1 |
| abalone | 21.64 ± 0.2 | 21.52 ± 0.2 | 21.63 ± 0.2 | 22.29 ± 0.2 | 21.79 ± 0.2 |
| image | 3.37 ± 0.1 | 3.14 ± 0.1 | 3.14 ± 0.1 | 3.18 ± 0.1 | 3.09 ± 0.1 |
| mushrooms | 0.02 ± 0.0 | 0.02 ± 0.0 | 0.01 ± 0.0 | 0.01 ± 0.0 | 0.00 ± 0.0 |
| musk | 3.84 ± 0.1 | 3.51 ± 0.1 | 3.59 ± 0.1 | 3.60 ± 0.1 | 3.41 ± 0.1 |
| mnist09 | 0.89 ± 0.0 | 0.85 ± 0.0 | 0.84 ± 0.0 | 0.98 ± 0.0 | 0.88 ± 0.0 |
| mnist14 | 0.64 ± 0.0 | 0.58 ± 0.0 | 0.60 ± 0.0 | 0.68 ± 0.0 | 0.63 ± 0.0 |
| mnist27 | 2.11 ± 0.1 | 1.86 ± 0.1 | 2.01 ± 0.1 | 2.06 ± 0.1 | 1.95 ± 0.1 |
| mnist38 | 4.45 ± 0.1 | 4.12 ± 0.1 | 4.32 ± 0.1 | 4.51 ± 0.1 | 4.25 ± 0.1 |
| mnist56 | 2.79 ± 0.1 | 2.56 ± 0.1 | 2.62 ± 0.1 | 2.77 ± 0.1 | 2.72 ± 0.1 |
| ringnorm | 13.16 ± 0.6 | 11.74 ± 0.6 | 12.46 ± 0.6 | 13.02 ± 0.6 | 12.86 ± 0.6 |
| spambase | 5.90 ± 0.1 | 5.64 ± 0.1 | 5.78 ± 0.1 | 5.81 ± 0.1 | 5.75 ± 0.1 |
| splice | 8.83 ± 0.2 | 8.33 ± 0.1 | 8.48 ± 0.1 | 8.55 ± 0.2 | 8.47 ± 0.1 |
| twonorm | 3.16 ± 0.1 | 2.98 ± 0.1 | 3.09 ± 0.1 | 3.29 ± 0.1 | 3.07 ± 0.1 |
| w4a | 2.60 ± 0.1 | 2.38 ± 0.1 | 2.50 ± 0.1 | 2.44 ± 0.1 | 2.36 ± 0.1 |
| waveform | 10.99 ± 0.1 | 10.96 ± 0.1 | 10.75 ± 0.1 | 10.95 ± 0.1 | 10.60 ± 0.1 |
| wine | 23.62 ± 0.2 | 25.52 ± 0.2 | 23.41 ± 0.1 | 24.16 ± 0.1 | 23.61 ± 0.1 |
| wisc | 5.32 ± 0.3 | 4.38 ± 0.2 | 5.00 ± 0.2 | 4.96 ± 0.3 | 4.72 ± 0.3 |

| Dataset | Adaboost | VadaBoost | RLP-Boost | RQP-Boost |
| --- | --- | --- | --- | --- |
| a5a | 17.59 ± 0.2 | 17.16 ± 0.1 | 18.24 ± 0.1 | 17.99 ± 0.1 |
| abalone | 21.87 ± 0.2 | 21.30 ± 0.2 | 22.16 ± 0.2 | 21.84 ± 0.2 |
| image | 1.93 ± 0.1 | 1.98 ± 0.1 | 1.99 ± 0.1 | 1.95 ± 0.1 |
| mushrooms | 0.01 ± 0.0 | 0.01 ± 0.0 | 0.02 ± 0.0 | 0.01 ± 0.0 |
| musk | 2.36 ± 0.1 | 2.07 ± 0.1 | 2.40 ± 0.1 | 2.29 ± 0.1 |
| mnist09 | 0.73 ± 0.0 | 0.72 ± 0.0 | 0.76 ± 0.0 | 0.71 ± 0.0 |
| mnist14 | 0.52 ± 0.0 | 0.50 ± 0.0 | 0.55 ± 0.0 | 0.52 ± 0.0 |
| mnist27 | 1.31 ± 0.0 | 1.24 ± 0.0 | 1.32 ± 0.0 | 1.29 ± 0.0 |
| mnist38 | 1.89 ± 0.1 | 1.72 ± 0.1 | 1.88 ± 0.1 | 1.87 ± 0.1 |
| mnist56 | 1.23 ± 0.1 | 1.17 ± 0.0 | 1.20 ± 0.0 | 1.19 ± 0.1 |
| ringnorm | 7.94 ± 0.4 | 7.78 ± 0.4 | 8.60 ± 0.5 | 7.84 ± 0.4 |
| spambase | 6.14 ± 0.1 | 5.76 ± 0.1 | 6.25 ± 0.1 | 6.03 ± 0.1 |
| splice | 4.02 ± 0.1 | 3.67 ± 0.1 | 4.03 ± 0.1 | 3.97 ± 0.1 |
| twonorm | 3.40 ± 0.1 | 3.27 ± 0.1 | 3.50 ± 0.1 | 3.38 ± 0.1 |
| w4a | 2.90 ± 0.1 | 2.90 ± 0.1 | 2.90 ± 0.1 | 2.90 ± 0.1 |
| waveform | 11.09 ± 0.1 | 10.59 ± 0.1 | 11.11 ± 0.1 | 10.82 ± 0.1 |
| wine | 21.94 ± 0.2 | 21.18 ± 0.2 | 22.44 ± 0.2 | 22.18 ± 0.2 |
| wisc | 4.61 ± 0.2 | 4.18 ± 0.2 | 4.63 ± 0.2 | 4.37 ± 0.2 |

For each dataset, the algorithm with the best percentage test error is represented by a cell that includes bolded text. All italicized entries in a row denote results that are not significantly different from the minimum error (according to a paired t-test at a 1% significance level). With decision stumps, both the EBBoost algorithm and the Vadaboost method have comparable performance and significantly outperform the AdaBoost algorithm. With CART as the weak learner, the Vadaboost method is once again significantly better than the AdaBoost algorithm.

A prediction on the number of iterations required in the worst case for Vadaboost can be given (which approximately matches the AdaBoost cost (squared) in Theorem 5). An assumption in that theorem was that the error rate of each weak learner was fixed. However, in practice, the error rates of the weak learners are not constant over the iterations. To see this behavior in practice, the results with the MNIST 3 versus 8 classification experiment are shown in FIG. 2.

Figure 2:
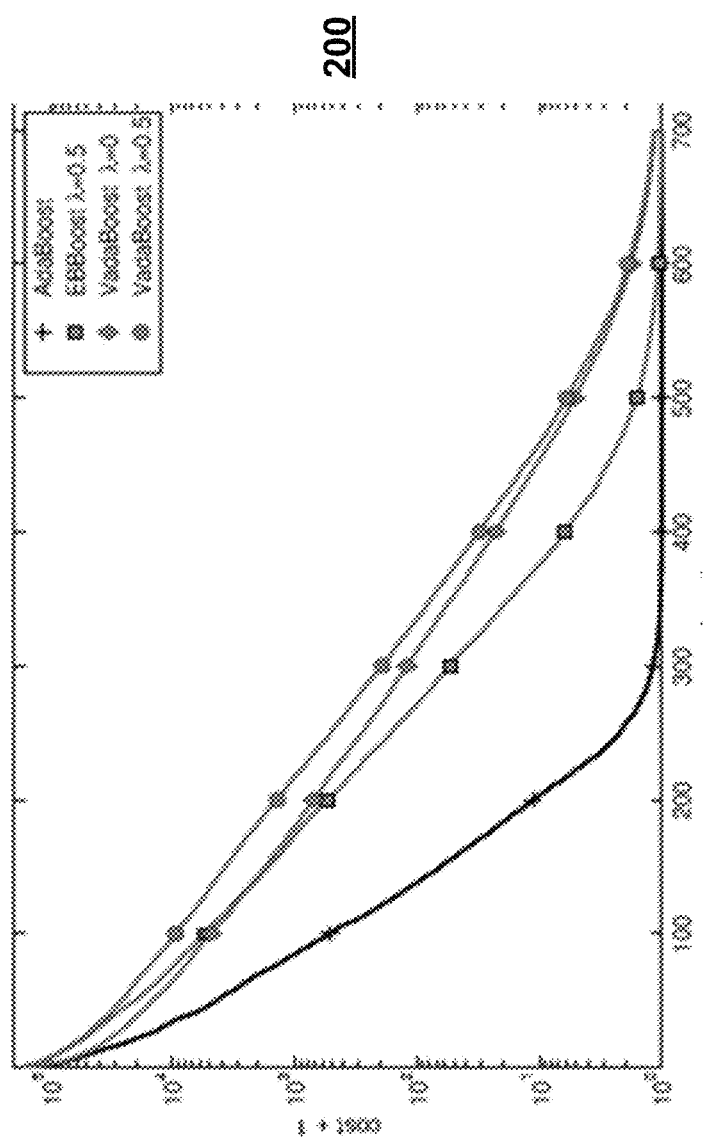
FIG. 2 is a visualization of an algorithm cost compared with a number of iterations for a plurality of boosting algorithms, according to embodiments of the invention.

FIG. 2 is a visualization 200 of an algorithm cost compared with a number of iterations for a plurality of boosting algorithms, according to an embodiment of the invention. Visualization 200 displays a cost (plus 1) as compared to a number of iterations for the following algorithms: an Adaboost algorithm, an EBBoost algorithm with a $\lambda=0.5$, a Vadaboost method with a $\lambda=0$, and a Vadaboost method with a $\lambda=0.5$. In FIG. 2, the cost (plus 1) is shown for each algorithm (the AdaBoost algorithm cost has been squared) versus the number of iterations using a logarithmic scale on the Y-axis. Since at $\lambda=0$, the EBBoost algorithm reduces to the AdaBoost algorithm, we omit its plot at that setting. From FIG. 2, it can be seen that the number of iterations required by the Vadaboost method is roughly twice the number of iterations required by the AdaBoost algorithm. At $\lambda=0.5$, there is only a minor difference in the number of iterations required by the EBBoost algorithm and the Vadaboost method.

For automatically tuning a value of a scalar parameter, $\lambda$, with a Vadaboost method, consider a training set and a validation set. Start with $\lambda=0$ and execute the Vadaboost method until an error rate on the validation set reduces by less than a threshold, $\delta$. Once this point is reached, increase the value of $\lambda$ by $\epsilon$ and continue to add weak learners. In the end, output the classifier that corresponds to the lowest error rate on the validation set through the entire run. By using the above heuristic, one does not have to try out every single $\lambda$ independently with the Vadaboost method. A classifier with a new value of $\lambda$ is built incrementally based on all the previously weak learners. The pseudo code for this heuristic is presented in Algorithm 1.

```
Algorithm 1 VadaBoost with automatic λ tuning. Training
set: (X_i, y_i)_{i=1}^n, validation set: (X_i^v, y_i^v)_{i=1}^{n^v},
thresholds ε ≥ 0, δ weak learner: H λ ← 0
s ← 0
bestVE ← ∞
Initialize the weights: w_i ← 1/n for i = 1, ..., n.
Initialize f to predict zero on all inputs.
while λ ≤ 1 do
    s ← s + 1
    u_i ← λnw_i^2 + (1 − λ)w_i
    Estimate a weak learner G^s (·) from training examples
    weighted by (u_i)_{i=1}^n α_s = (1/4) log( Σ_{i:G^s(X_i)=y_i} u_i  /  Σ_{j:G^s(X_j)≠y_j} u_j )

if α_s ≤ 0 then
        λ ← λ + ε
        continue
    end if
    f(·) ← f(·) + α_s G^s (·)

VE[s] ← (1/n^v) Σ_{i=1}^{n^v} I[f_s(X_i^v)y_i^v ≤ 0]

if VE[s] < bestVE then
        bestVE ← VE[s]
        S ← s
    end if
    if (s > 1) AND (VE[s − 1] − VE[s] ≤ δ) then
        λ ← λ + ε
    end if
    w_i ← w_i exp(−y_i G^s(X_i)α_s)/Z_s where Z_s is such that Σ_{i=1}^n w_i = 1
end while
Output the classifier: f(·) := Σ_{s=1}^S α_s G^s (·)
```

Figure 3:
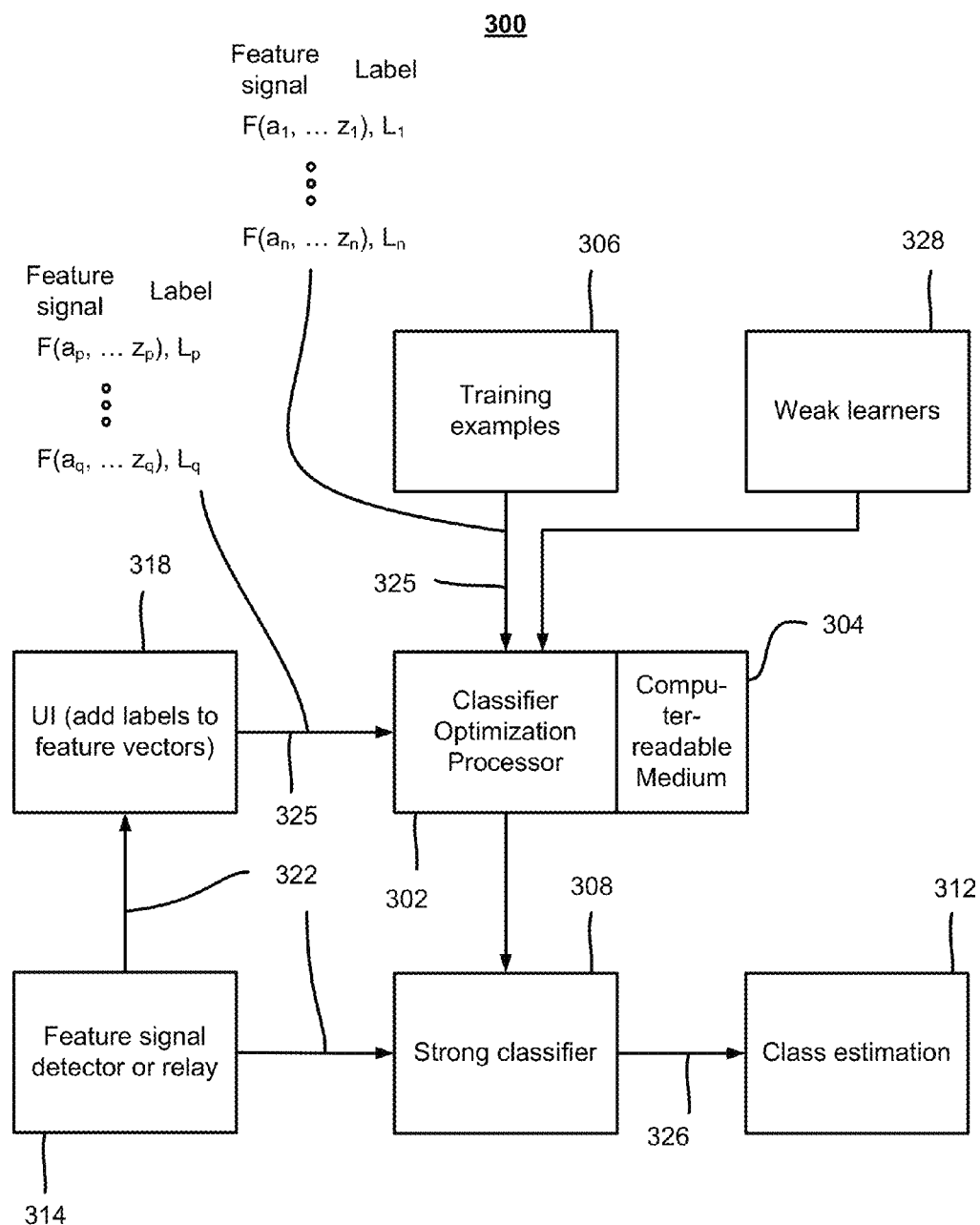
FIG. 3 is a block diagram of an example embodiment of a system for optimizing one or more classifiers.

FIG. 3 is a block diagram of an example embodiment of a system 300 for generating and using classifiers which may be used in whole or in part to form various embodiments. Those embodiments may include classifiers, a creator or improver of a classifier, a system embedding a trainable classifier. A system 300 includes a classifier optimization processor 302 which may incorporate, or be connected with, a non-volatile data store such as a computer-readable medium 304. A drive or I/O system may be inherent in the computer readable medium 304. The computer-readable medium 304 may store and retrieve program code and data. The program code may be encode methods for implementing any of the disclosed methods for creating or improving a classifier as well as code that defines weak learners or variegated pools of classifiers, for example pools that recognize different features of a target represented in a signal to be classified. The computer-readable medium 304 can include an electronic (e.g., random-access memory ("RAM"), read-only memory ("ROM"), flash memory, electrically erasable programmable read-only memory ("EEPROM"), or the like), optical (compact disc read-only memory ("CDROM"), DVD, or the like), or magnetic (hard disk, floppy disk, or the like) data storage medium. The classifier optimization processor 302 may also employ cloud storage where the latter may incorporate computer readable medium 304 and communicate with the processor 302 through a network or internet.

In operation, the classifier optimization processor 302 receives one or more training examples 306 as input. Each training example of the one or more training examples 306 can include one or more elements. For example, each training example can include text, images, vectors, etc. Using techniques previously described, the classifier optimization processor can estimate one or more weak classifiers, assign a weight to each weak classifier of the one or more week classifiers, and combine the weighted weak classifiers into an overall strong classifier 308 as an output, where the classifier optimization processor 302 produces the overall strong classifier 308 as output. Note that the training examples 306, weak learners 328, and strong classifier 308 are indicated by boxes but it will be understood that this is a figurative representation and the actual inputs and outputs would be stored as data on the computer readable medium 304 or an equivalent.

The classifier optimization processor 302 can include a microprocessor, microcontroller, digital signal processor, field-programmable gate array ("FPGA"), application-specific integrated circuit ("ASIC"), or the like. Also, the classifier optimization processor 302 can be a single processor or a co-located or distributed multi-processor system, having a parallel processing architecture, a cloud computing architecture, or the like.

The training examples 306 may include feature vectors for the various weak learners, each with a corresponding label. The labels may represent a correct class output of the classifier to be trained given the inputs of the feature vector. Feature vectors may also be obtained from a user interface 318 or other device which adds labels to an applied signal 322 from a data source such as a sensor array or other feature signal detector or relay, that contains one or more feature vectors to form a labeled data signal 325. For example, feature signal detector or relay may be a data store of a camera and the applied signal may represent an image. The user interface 318 may be a user interface of the camera that allows the image, or a part therein, to be classified, such as the name of person whose face is represented in the image. Another example is a diagnostic suite of sensors on a machine, such as a vehicle, where the user interface is provided to identify a condition class corresponding to a current feature vector. The condition class provides a label for the feature vector. Many examples may be drawn from the literature and products relating to supervised learning applications so further examples will not be enumerated. Examples from detectors can be combined with didactic examples in an embedded system such as shown.

Ultimately in these embodiments, or certain ones, a class estimation 312 may be output from a feature vector 322 applied to the strong classifier 308. It will be evident that the system 300 may be employed as both classifier and a learning system. A factory may train a strong classifier before a product leaves the factory and then the classifier may yield class outputs during use of the product. A user may be enabled to make corrections to incorrect class estimations 312 or to clarify ambiguous class estimations. For example, an interface to the strong classifier may provide multiple possible class assignments that have different probability estimates associated with them and allow the user to select the correct one from among them.

Figure 4:
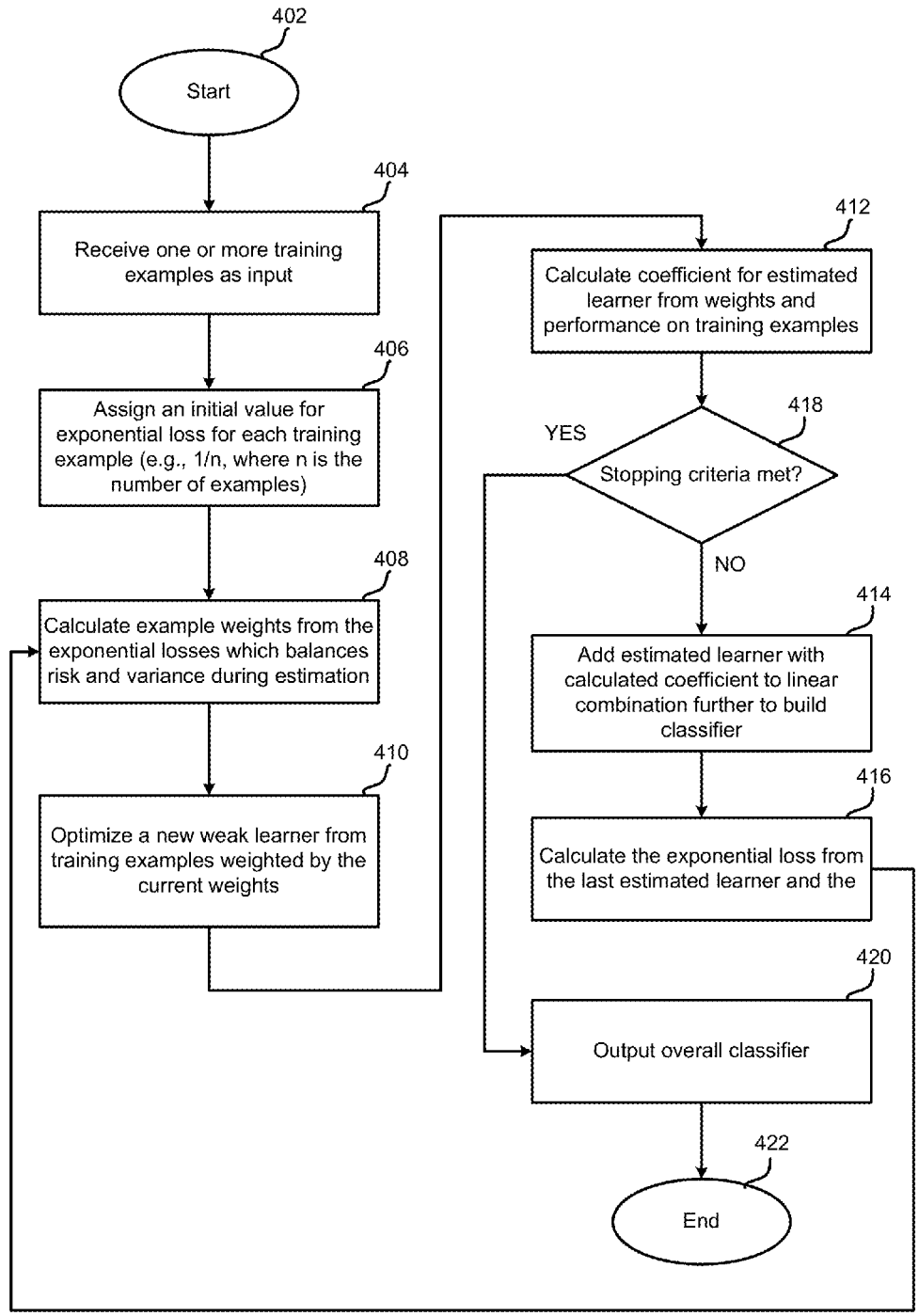
FIG. 4 is a flowchart showing an example embodiment of a method for optimizing one or more classifiers.

FIG. 4 is a flowchart showing an example embodiment of a method for optimizing one or more classifiers. Processing begins at 402 and continues to 404. At 404, one or more training examples are received as inputs. Each training example can include one or more elements (dimensions of the training vector). For example, each training example can include text, image, or other data. Processing continues to 406. An initial value of an exponential loss ($w_i$ in Vadaboost, for example) is provided. The initial values may be identical and sum to unity. Each corresponds to a training example. Processing continues to 408.

At 408, the loss for each training example is converted to a weight ($u_i$ in Vadaboost, for example) which measures variance and mean value of the loss. As explained, the weight may be any of a variety of functions that penalize variance. Alternatively the weight may be derived from a non-linear function of the loss. In the Vadaboost embodiment, the weight is updated according to $u_i \leftarrow \lambda n w_i^2 + (1-\lambda) w_i$. The scalar parameter $\lambda$ can include a value within a range from 0 to 1. Further, the non-linear function can be of any function suitable for the method including ones that penalize variance and residual loss. Processing continues to 410.

At 410, a classifier is estimated from the one or more weighted training examples or an optimal classifier is selected from a pool of classifiers such that an estimated weak learner is derived or an optimal weak classifier is added based on the minimization of the error based on the weighted example data. Note it will be clear to those of skill in the art that the weight $u_i$ may be applied to respective scores of the class estimations, for example, where the score takes the value of 1 or −1 depending on whether the weak learner's estimate for the example is correct or incorrect. Note also the classifier can be any weak classifier that performs a classification better than random guessing, such as elements of a decision tree. Processing continues to 412.

At 412, a coefficient for the estimated weak learner or the selected classifier is assigned thereto so that it can be added to a growing linear combination of classifiers or trained learners. The coefficient (e.g., $$\alpha_s = \frac{1}{2} \log \left( \sum_{i: G^s(X_i) = y_i} w_i \Big/ \sum_{j: G^s(X_j) \neq y_j} w_j \right)$$

in Vadaboost method) can be calculated or assigned to the respective classifier or learner based on a number of training examples that the classifier correctly classified and a number of training examples that the classifier incorrectly classified. Processing continues to 414.

At 418, it is determined whether a stopping criterion has been met. An example of a stopping criteria can be when the coefficient for the estimated learner or selected classifier is less than zero. If the stopping criteria has not been met, processing proceeds to 414. If the stopping criterion has been met, processing skips to 420.

At 414, the classifier multiplied by the coefficient is added to the growing linear combination that will form the overall classifier. The overall classifier can be a strong classifier that performs a classification better than the classifier, and whose performance is correlated with a correct classification. Processing continues to 416.

At 416, a loss estimation is calculated using the current learner or classifier multiplied by the previous loss and the result is normalized so that the sum of the resulting values is equal to 1. For example, $w_i \leftarrow w_i \exp(-y_i G^s(X_i) \alpha_s)/Z_s$ where $Z_s$ is such that $\sum_{i=1}^{n} w_i = 1$. Processing returns then to 408 where the normalized cumulative loss parameter $w_i$ is converted by the non-linear process to the weight used for estimation or selection of the learner or classifier.

At 420, the overall classifier is output. In certain embodiments, the iterative repeating of the optimizing at 408 iteratively minimized a cost function of the overall classifier. Processing continues to 422, where processing ends.

The method of FIG. 4 can be implemented via a programmed processor having access to software instructions stored on a non-transitory computer-readable medium. A non-transitory computer-readable medium includes a hard drive, a compact disc, flash memory, volatile memory, an optical memory, an optical loop memory, a loop memory, a regenerated memory, a removable memory, RAM, ROM, programmable read-only memory ("PROM"), erasable programmable read-only memory ("EPROM"), EEPROM, cache, remote memory, local memory, buffer, and another other non-transitory medium, but does not include a transitory signal per se. The software instructions, when executed, cause the processor to perform the operations previously described and illustrated in FIG. 4.

Figure 5:
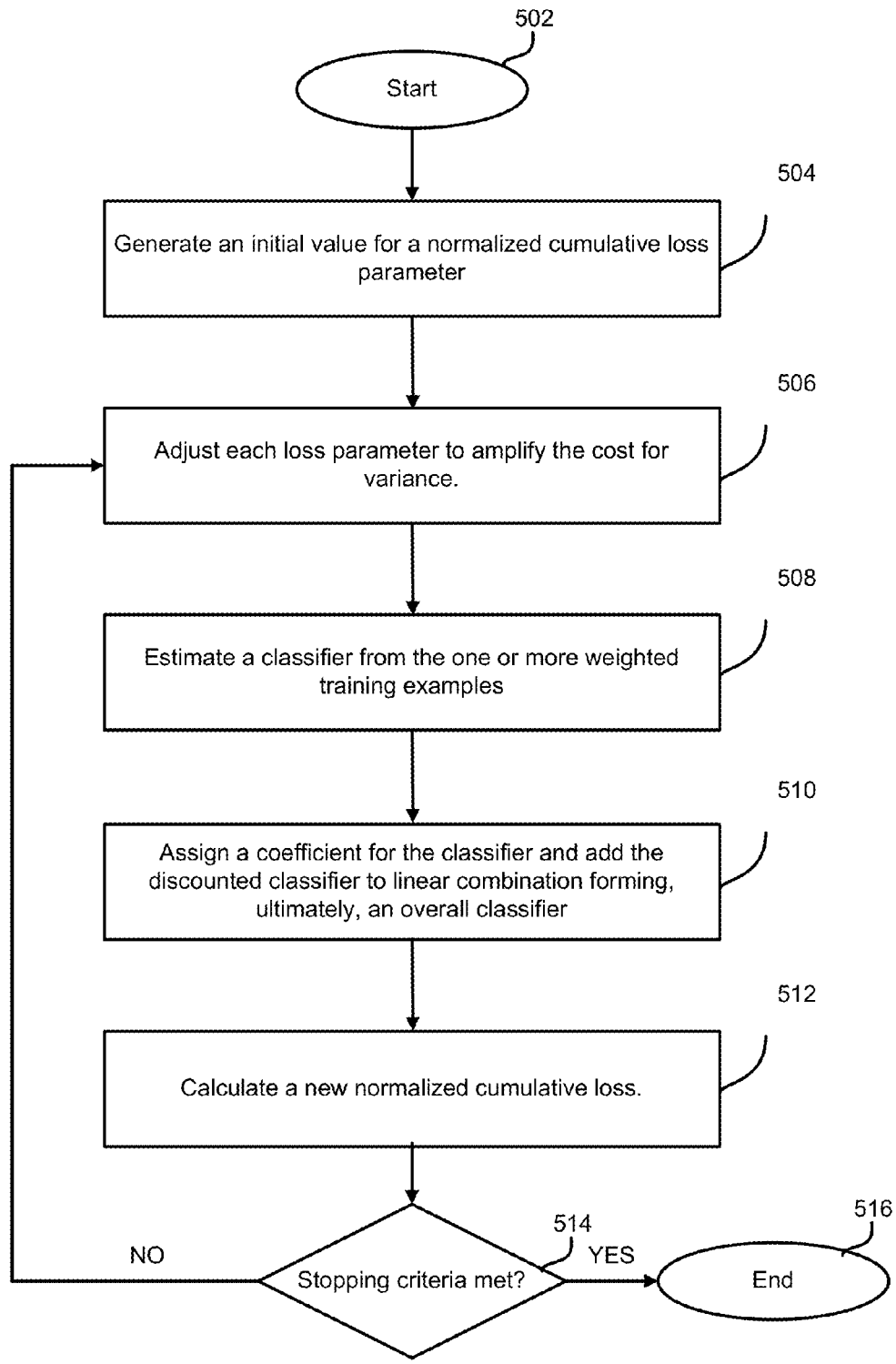
FIG. 5 is a flowchart showing another example embodiment of a method for optimizing one or more classifiers.

FIG. 5 is a flowchart showing another example embodiment of a method for optimizing one or more classifiers. Processing begins at 502 and continues to 504.

At 504, an initial value for a normalized cumulative loss is assigned to training examples. At 506, the loss parameter for each training example is modified to reflect the penalty for variance using some non-linear function. For example, each parameter can be modified by exponentially adjusting each loss parameter based on a scalar parameter that defines a relationship between a risk of each training sample and a sample variance of each training example. The scalar parameter can include a value within a range from 0 to 1. Further, the non-linear function can include the function, $\lambda n w_i^2 + (1-\lambda) w_i$, where $w_i$ represents each loss parameter of each training example, where n represents a number of the one or more loss parameters of the one or more training examples, and where represents the scalar parameter. In embodiments, the function is such that the scores of estimates corresponding to training samples with higher values are amplified. Processing continues to 508.

At 508, a classifier is estimated from the one or more weighted training examples. The classifier can be a weak classifier that performs a classification better than random guessing. Processing continues to 510.

At 510, a coefficient is assigned to the classifier. The coefficient can be assigned to the classifier based on a number of training examples that the classifier correctly classified and a number of training examples that the classifier incorrectly classified. Further, the weighted classifier is assigned to an overall classifier. Processing continues to 512.

At 512, each loss parameter is adjusted based on whether the classifier correctly classifies each training example. For example, each loss parameter can be adjusted by exponentially decreasing a loss parameter of a training example when the classifier correctly classifies the training example, and by exponentially decreasing the corresponding loss parameter of a training example when the classifier incorrectly classifies the training example. Processing continues to 514.

At 514, it is determined whether a stopping criteria has been met. An example of a stopping criteria can be when a value of the coefficient of the classifier is less than 0. If the stopping criteria has not been met, processing returns to 506, and processing continues from there. If the stopping criteria has been met, processing continues to 516, where processing ends.

The method of FIG. 5 can be implemented via a programmed processor having access to software instructions stored on a non-transitory computer-readable medium. The software instructions, when executed, cause the processor to perform the operations previously described and illustrated in FIG. 5.

Figure 6:
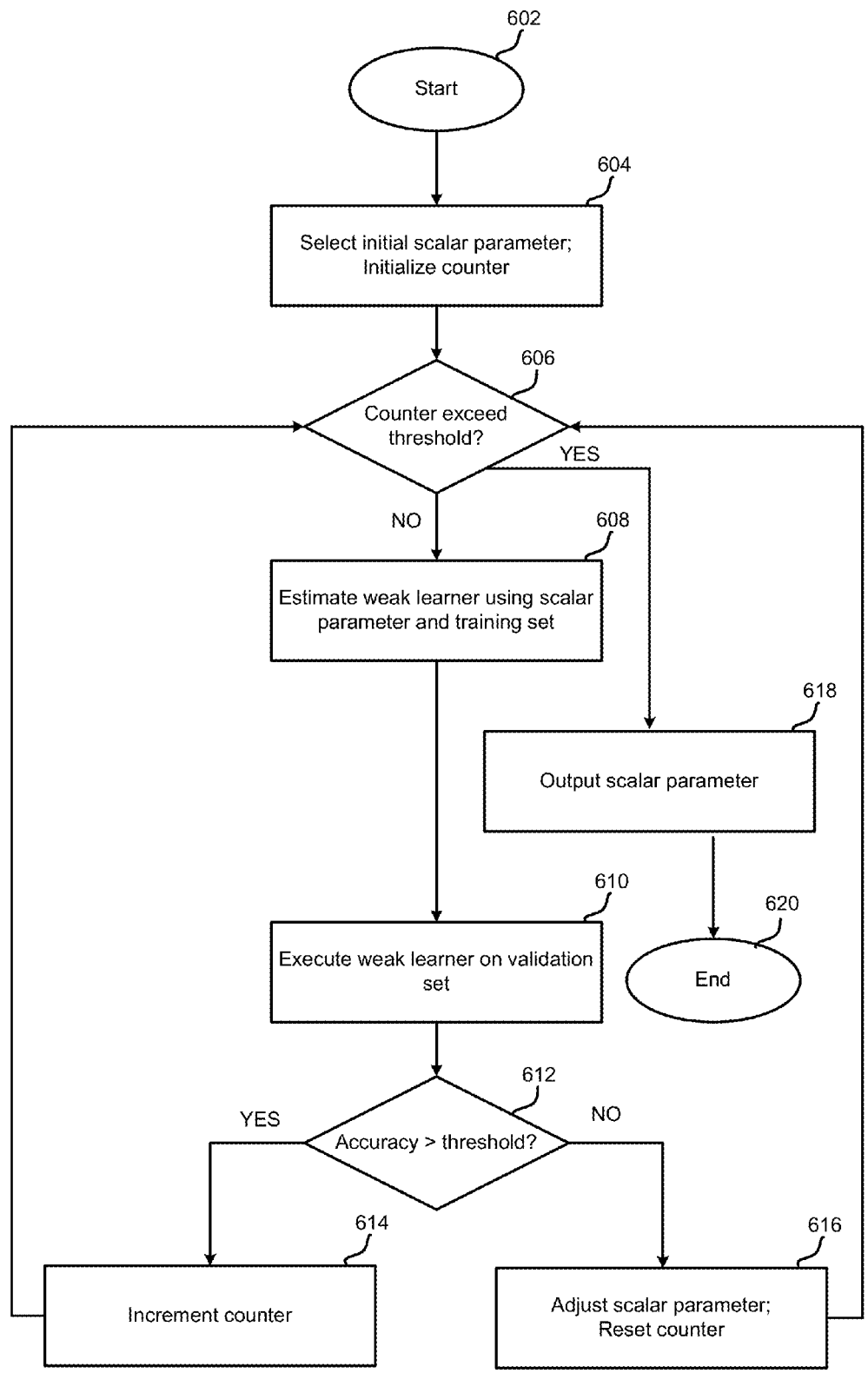
FIG. 6 is a flowchart showing an example embodiment of a method for selecting an optimal scalar parameter used to optimize one or more classifiers.

FIG. 6 is a flowchart showing an example embodiment of a method for selecting an optimal scalar parameter, $\lambda$, used to optimize one or more classifiers. Processing begins at 602 and continues to 604.

At 604, an initial scalar parameter, $\lambda$, is selected. In certain embodiments, 0 can be selected as the initial scalar parameter (i.e., $\lambda=0$). In certain embodiments, 1 can be selected at the initial scalar parameter (i.e., $\lambda=1$). Further, at 604, a counter is initialized. A counter can keep track of a number of weak learners that are estimated and executed for a scalar parameter. Processing continues to 606.

At 606, it is determined whether the counter exceeds a pre-defined threshold. As described below in greater detail, if a scalar parameter, $\lambda$, can be used to estimate a pre-defined number of weak learners (e.g., 100 weak learners), and an accuracy of each weak learner is continuously increased at an acceptable rate until the counter exceeds a pre-defined threshold, then the scalar parameter can be identified as an optimal scalar parameter. However, if the scalar parameter is used to estimate a weak leaner that does increase the accuracy at the acceptable rate before the counter exceeds the pre-defined threshold, then it can be determined that the scalar parameter is not an optimal scalar parameter, and needs to be adjusted. If the counter does not exceed the pre-defined threshold, processing proceeds to 608. If the counter does exceed the pre-defined threshold, processing proceeds to 618.

At 608, a weak learner is estimated using the scalar parameter, $\lambda$, and a training set that includes one or more training samples, as previously described. Processing continues to 610.

At 610, the weak learner is executed on a validation set that includes one or more validation samples. A validation set is a data set that can be used to assess the accuracy of a classifier (i.e., the number of correct classifications versus the number of incorrect classification). A validation set can be used to prevent over-fitting, where a classifier describes random noise error or noise, instead of an underlying relationship. Once the weak learner is executed, an accuracy of the weak learner can be determined. Processing continues to 612.

At 612, it is determined whether the accuracy of the weak learner is greater than a threshold. The determination of whether the accuracy of the weak leaner is greater than the threshold can be accomplished according to a number of techniques. For example, an expected accuracy can be calculated based on a number of iterations of the execution of the weak learner, and the threshold can be set to the calculated expected accuracy. As another example, a static expected accuracy can be determined for the weak learner (where the static expected accuracy is not adjusted based on a number of iterations of the execution of the weak learner), and the threshold can be set to the static expected accuracy. If the accuracy of the weak learner is greater than the threshold, processing proceeds to 614. If the accuracy of the weak learner is not greater than the threshold, processing proceeds to 616.

At 614, the counter is incremented. Processing returns to 606, and processing continues from there.

At 616, the scalar parameter, $\lambda$, is adjusted. In embodiments where 0 is selected as the initial scalar parameter, the scalar parameter can be incremented. In embodiments where 1 is selected at the initial scalar parameter, the scalar parameter can be decremented. Processing returns to 606, and processing continues from there.

At 618, the scalar parameter is output. This scalar parameter is the optimal scalar parameter, as determined by the method. Processing continues to 620, where processing ends.

The method of FIG. 6 can be implemented via a programmed processor having access to software instructions stored on a non-transitory computer-readable medium. A non-transitory computer-readable medium includes a hard drive, a compact disc, flash memory, volatile memory, an optical memory, an optical loop memory, a loop memory, a regenerated memory, a removable memory, RAM, ROM, programmable read-only memory ("PROM"), erasable programmable read-only memory ("EPROM"), EEPROM, cache, remote memory, local memory, buffer, and another other non-transitory medium, but does not include a transitory signal per se. The software instructions, when executed, cause the processor to perform the operations previously described and illustrated in FIG. 6.

Figure 7:
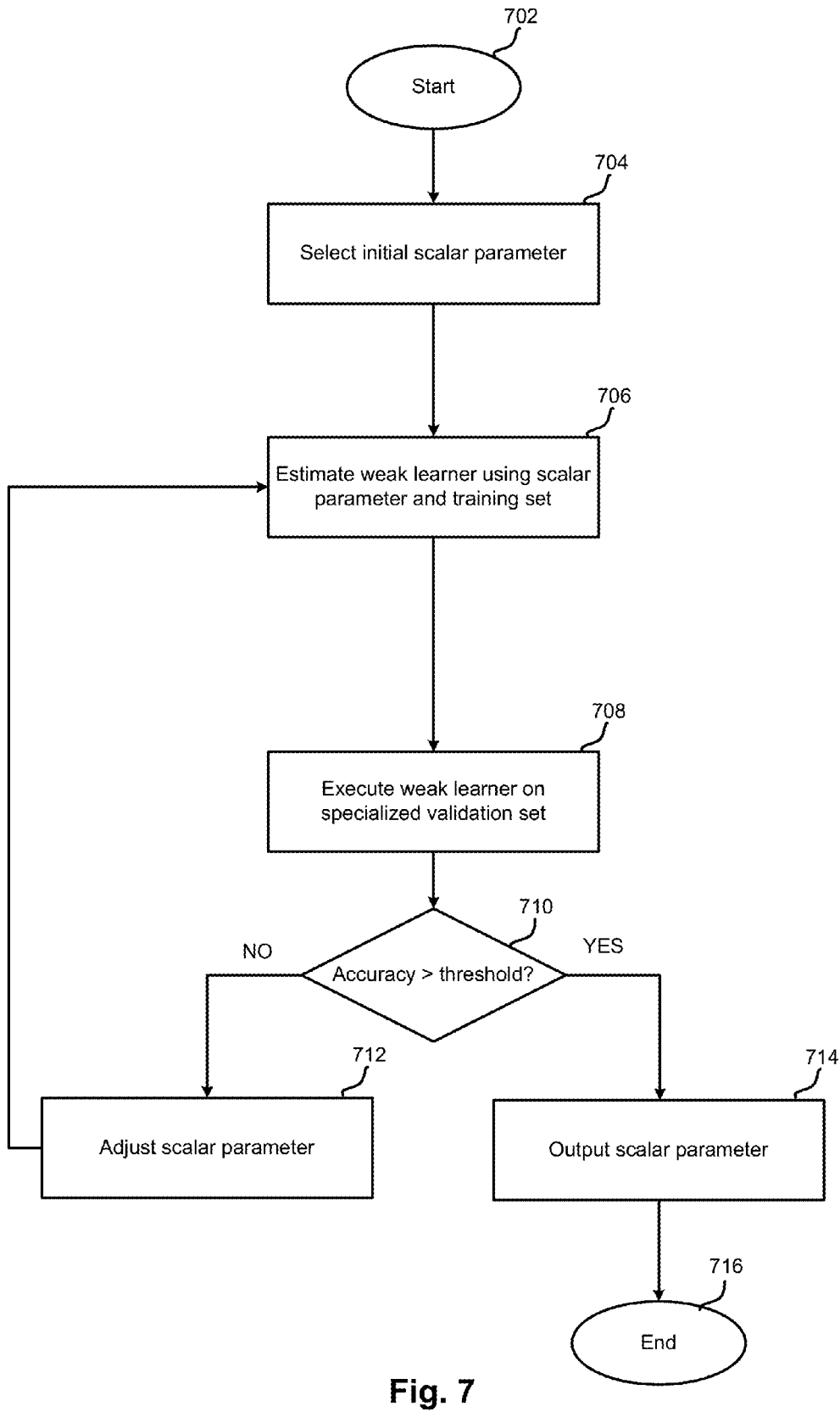
FIG. 7 is a flowchart showing another example embodiment of a method for selecting an optimal scalar parameter used to optimize one or more classifiers.

FIG. 7 is a flowchart showing another example embodiment of a method for selecting an optimal scalar parameter, $\lambda$, used to optimize one or more classifiers. Processing begins at 702 and continues to 704.

At 704, an initial scalar parameter, $\lambda$, is selected. In certain embodiments, 0 can be selected as the initial scalar parameter (i.e., $\lambda=0$). In certain embodiments, 1 can be selected at the initial scalar parameter (i.e., $\lambda=1$). Processing continues to 706.

At 706, a weak learner is estimated using the scalar parameter, $\lambda$, and a training set that includes one or more training samples, as previously described. Processing continues to 708.

At 708, the weak learner is executed on a specialized validation set that includes one or more specialized validation samples. According to the embodiment, the specialized validation samples of the specialized validation set can be part of a set of data samples that allows a determination of an accuracy of a weak learner in fewer iterations, or sometimes, a single iteration. Examples of such sets of data samples can include sets of data samples that have a high probability of resulting in the largest difference between the number of data samples correctly classified and the number of data samples incorrectly predicted. Once the weak learner is executed, an accuracy of the weak learner can be determined. Processing continues to 710.

At 710, it is determined whether the accuracy of the weak learner is greater than a threshold. As previously described, an expected accuracy of a weak learner. If the accuracy of the weak learner is not greater than the threshold, processing proceeds to 712. If the accuracy of the weak learner is greater than the threshold, processing proceeds to 714.

At 712, the scalar parameter, $\lambda$, is adjusted. In embodiments where 0 is selected as the initial scalar parameter, the scalar parameter can be incremented. In embodiments where 1 is selected at the initial scalar parameter, the scalar parameter can be decremented. Processing returns to 706, and processing continues from there.

At 714, the scalar parameter is output. This scalar parameter is the optimal scalar parameter, as determined by the method. Processing continues to 716, where processing ends.

The method of FIG. 7 can be implemented via a programmed processor having access to software instructions stored on a non-transitory computer-readable medium. A non-transitory computer-readable medium includes a hard drive, a compact disc, flash memory, volatile memory, an optical memory, an optical loop memory, a loop memory, a regenerated memory, a removable memory, RAM, ROM, programmable read-only memory ("PROM"), erasable programmable read-only memory ("EPROM"), EEPROM, cache, remote memory, local memory, buffer, and another other non-transitory medium, but does not include a transitory signal per se. The software instructions, when executed, cause the processor to perform the operations previously described and illustrated in FIG. 7.

Thus, according to embodiments of the invention, a novel method is provided that can overcome a key weakness identified in the EBBoost algorithm (i.e., that can efficiently overcome the limitation to enumerable weak learners). The Vadaboost method reduces a well motivated cost by iteratively minimizing an upper bound which, unlike the EBBoost algorithm, allows the boosting method to handle any weak learner by estimating weights on the data. The update rule of the Vadaboost method has a simplicity that is reminiscent of the AdaBoost algorithm. Furthermore, despite the use of an upper bound, the novel boosting method remains efficient. Even when the bound is at its loosest, the number of iterations required by the Vadaboost method is a small constant factor more than the number of iterations required by the AdaBoost algorithm. Experimental results showed that the Vadaboost method outperforms the AdaBoost algorithm in terms of classification accuracy and efficiently applying to any family of weak learners.

The effectiveness of boosting has been explained via margin theory though it has taken a number of years to settle certain open questions. Considering the simplicity and effectiveness of the Vadaboost method, one natural future research direction is to study the margin distributions it obtains. Another future research direction is to design efficient sample variance penalization algorithms for other problems such as multi-class classification, ranking, and so on.

In all of the above embodiments, the training data and data to be classified may represent actual events or objects. The utility of classifiers generally stems from the ability of a computer recognize or classify events or objects in a data stream or corpus, such as data from a medical image or data from sensors of a machine whose state is to be classified. Training data may be simulated.

Embodiments of the disclosed subject matter include a computer-implemented method for optimizing classifiers, the computer-implemented method comprising receiving by a processor, training data representing classifiable events or objects including label data identifying respective classes of the events or objects, wherein each training example comprises one or more elements; associating a respective loss parameter with each of the training examples; (a) calculating a weight from each of the loss parameters that is a non-linear function of the loss parameter; (b) optimizing a weak learner or selecting a classifier from a pool of classifiers, to minimize an exponential loss of the weak learner or classifier on the training examples; (c) calculating a coefficient for the optimized weak learner or the selected classifier which is proportional to a logarithm of the ratio of the sum of the assigned weights corresponding to the examples classified correctly by the optimized weak learner or the selected classifier and the sum of the assigned weights corresponding to the examples classified correctly by the optimized weak learner or the selected classifier; (d) updating the loss parameters to the product of each with the exponential loss of the weak learner or classifier on its respective training example; repeating the operations defined in clauses a through d until a stop criterion is met; forming a linear combination of the optimized weak learners or the selected classifiers obtained from multiple iterations of operations a through d, each weighted by a respective one of the coefficients calculating in operation c; and outputting data representing said linear combination.

The calculating a weight from each of the loss parameters that is a non-linear function of the loss parameter can include calculating the function $u_i \leftarrow \lambda n w_i^2 + (1-\lambda)w_i$, where $w_i$ is the loss parameter, n is the number of training examples, is a constant between 0 and 1 and $u_i$ is the weight. Updating the loss parameters can include calculating a factor such that the sum of the loss parameters over all the training examples is equal to one. The operation c can be such that a penalty responsive to variance is included in a cost function that is effectively reduce through successive iterations of operation c. The optimizing a weak learner or selecting a classifier from a pool of classifiers can include optimizing a weak learner. The optimizing a weak learner or selecting a classifier from a pool of classifiers can include selecting an optimal classifier from a pool of classifiers. The pool of classifiers can be adapted for responding to specific features of an object or event to be classified. The computer-implemented method may also include employing the linear combination as classifier including applying a signal containing data thereto and outputting a signal containing class data therefrom.

Embodiments of the disclosed subject matter include a computer-implemented method for optimizing classifiers, the computer-implemented method comprising: receiving one or more training examples, wherein each training example comprises one or more elements; assigning a weight to each training example of the one or more training examples; optimizing each weight of each training sample based on a sample variance of each training example using a non-linear function; estimating a classifier from the one or more weighted training samples; assigning a coefficient to the classifier based on a number of training examples that the classifier correctly classified and a number of training examples that the classifier incorrectly classified; and adding the weighted classifier to an overall classifier.

The computer-implemented method may also include exponentially adjusting each loss parameter $w_i$ of each training example based on a scalar parameter that defines a relationship between a risk of each training example and the sample variance of each training example. The scalar parameter may include a value within a range from 0 to 1. The non-linear function may include a function, $\lambda n w_i^2 + (1-\lambda)w_i$, where $w_i$ represents each loss parameter of each training example, where n represents a number of the one or more loss parameters of the one or more training examples, and where represents the scalar parameter.

The computer-implemented method may also include adjusting each weight of each training example based on whether the classifier correctly classifies each training example, and iteratively repeating the optimizing, estimating, assigning the weight to the classifier, and the adding until a stopping criteria is met. The computer-implemented method may also include exponentially decreasing a loss parameter corresponding to a training example when the classifier correctly classifies the training example, and exponentially increasing a loss parameter corresponding to a training example when the classifier incorrectly classifies the training example. The stopping criteria can include a value of the loss parameter of the classifier being less than 0. The repeating of the optimizing can iteratively minimize a cost function of the overall classifier.

In certain embodiments, the computer-implemented method may also include selecting a scalar parameter. The computer-implemented method may also include estimating a classifier from the one or more training examples. The computer-implemented method may also include executing the classifier on one or more validation examples. The computer-implemented method may also include determining whether an accuracy of the classifier is greater than a threshold. The computer-implemented method may also include adjusting the scalar parameter where the accuracy of the classification function is not greater than a threshold.

Embodiments of the method, apparatus, system, computer program product and computer readable medium for optimizing one or more classifiers may be implemented on one or more general-purpose computers, one or more special-purpose computers, a programmed microprocessor or microcontroller and peripheral integrated circuit element, an ASIC or other integrated circuit, a digital signal processor, a hardwired electronic or logic circuit such as a discrete element circuit, a programmed logic device, such as a programmable logic device ("PLD"), programmable logic array ("PLA"), FPGA, programmable array logic ("PAL"), or the like. In general, any process capable of implementing the functions or processed described herein can be used to implement embodiments of the method, apparatus, system, computer program product, or computer readable medium for optimizing one or more classifiers.

Furthermore, embodiments, of the disclosed method, software, and computer program product (or computer readable medium) for optimizing one or more classifiers may be readily implemented, fully or partially, in software using, for example, object or object-oriented software development environments that provide portable source code that can be used on a variety of one or more computer platforms. Alternatively, embodiments of the disclosed method for optimizing one or more classifiers can be implemented partially or fully in hardware using, for example, standard logic circuits or a very-large-scale integration ("VLSI") design. Other hardware or software can be used to implement embodiment depending on the speed and/or efficiency requirements of the system, the particular function, and/or a particular software or hardware system, microprocessor, or one or more computer systems being utilized. Embodiments of the method, apparatus, system, computer program product (or computer-readable medium) for optimizing one or more classifiers can be implemented in hardware and/or software using any known or later developed systems or structures, devices and/or software by those of ordinary skill in the applicable art from the functional description provided herein and with a general bask knowledge of the one or more computer arts.

Moreover, embodiments of the disclosed method for optimizing one or more classifiers can be implemented in software stored on a computer readable medium, a plurality of computer readable media, or one or more computer program products, and adapted to be executed on a programmed general-purpose computer, a special-purpose computer, a microprocessor, or the like. Also, the optimization method can be implemented as a program embedded on a personal computer (or a plurality of personal computers), such as a JAVA® or common gateway interface ("CGI") script, as a resource residing on a server or graphics workstation, as a routine embedded in a dedicated processing system, or the like. The method, apparatus, and system can also be implemented by physically incorporating the method for optimizing one or more classifiers, into a software and/or hardware system, such as the hardware and software systems of a medical imaging system, a digital imaging system, or an image processing system.

Note that while many of the operations described herein are described in terms of mathematical functions and operations, such functions and operations can be approximated while still permitting the solutions of the respective problems to be achieved. For example, the exponential functions, multiplication functions, and/or logarithmic functions may have computational analogs or approximations that may be used to implement them. Thus, in using the mathematical terms in the above discussion it should be understood that the embodiments include those in which such approximations are used.

Note that in all embodiments where a system or component loads software or data from a storage device or computer readable medium, it will be understood that modifications of such embodiments are possible and considered within the embodiments of the disclosed subject matter. For example, data may be read from a stream provided by a remote data storage device operating according to any principle including volatile or nonvolatile memory. An "Internet drive," network attached storage, distributed storage, or any other suitable device may also be used.

It is, therefore, apparent that there is provided in accordance with the present invention, a method, apparatus, system, a computer program product, and a computer readable medium with software for optimizing one or more classifiers. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A computer-implemented method, comprising:
receiving by a processor, training examples representing classifiable events or objects including label data identifying respective classes of the events or objects, wherein each training example comprises one or more elements;
associating a respective loss parameter with each of the training examples, a value of each respective loss parameter being initialized to an initial value;
(a) calculating a weight of each training example based on a sample variance of the training example using a non-linear function;
(b) optimizing a weak learner in a pool of weak learners or selecting a classifier from a pool of classifiers, to minimize an exponential loss of the weak learner or classifier on the weighted training examples, without evaluating all the weak learners in the pool of weak learners and without evaluating all of the classifiers in the pool of classifiers;
(c) calculating a coefficient for the optimized weak learner or the selected classifier which is proportional to a logarithm of the ratio of the sum of the assigned weights corresponding to the examples classified correctly by the optimized weak learner or the selected classifier and the sum of the assigned weights corresponding to the examples incorrectly classified by the optimized weak learner or the selected classifier;

(d) updating the loss parameters to the product of each with the exponential loss of the weak learner or classifier on its respective training example;

repeating the operations defined in clauses a through d until a stop criterion is met;

forming a linear combination of the optimized weak learners or the selected classifiers obtained from multiple iterations of operations a through d, each weighted by a respective one of the coefficients calculated in operation c; and outputting data representing said linear combination.

2. The method of claim 1, wherein the calculating a weight from each of the loss parameters that is a non-linear function of the loss parameter includes calculating the function $u_i \leftarrow \lambda n w_i^2 + (1-\lambda) w_i$, where $w_i$ is the loss parameter, n is the number of training examples, $\lambda$ is a constant between 0 and 1 and $u_i$ is the weight.

3. The method of claim 1, wherein updating the loss parameters includes calculating a factor such that the sum of the loss parameters over all the training examples is equal to one.

4. The method of claim 1, wherein the operation c is such that a penalty responsive to variance is included in a cost function that is effectively reduced through successive iterations of operation c.

5. The method of claim 1, wherein the optimizing a weak learner or selecting a classifier from a pool of classifiers includes selecting an optimal classifier from a pool of classifiers.

6. The method of claim 5, wherein the pool of classifiers are adapted for responding to specific features of an object or event to be classified.

7. The method of claim 1, further comprising employing the linear combination as classifier including applying a signal containing data thereto and outputting a signal containing class data therefrom.

8. The method of claim 1, wherein a cost function of the linear combination is minimized.

9. The method of claim 1, wherein a lowest weight is calculated for a training example with a highest sample variance, and a highest weight is calculated for a training example with a lowest sample variance.

10. The method of claim 1, wherein each classifier comprises a weak classifier that performs a classification better than random guessing; and wherein the linear combination comprises a strong classifier that performs a classification better than each weak classifier, and whose performance is correlated with a correct classification.

11. An apparatus, comprising:
a processor configured to load and execute software instructions stored on a non-transitory computer readable medium, the software instructions, when executed, cause the processor to perform operations comprising:
receiving one or more training examples representing classifiable events or objects including label data identifying respective classes of the events or objects, wherein each training example comprises one or more elements;
associating a respective loss parameter with each training example of the one or more training examples, a value of each respective loss parameter being initialized to an initial value;

(a) calculating a weight of each training example based on a sample variance of the training example using a non-linear function;

(b) optimizing a weak learner in a pool of weak learners or selecting a classifier from a pool of classifiers, to minimize an exponential loss of the weak learner or classifier on the one or more weighted training examples, without evaluating all the weak learners in the pool of weak learners and without evaluating all of the classifiers in the pool of classifiers;

(c) calculating a coefficient for the optimized weak learner or the selected classifier which is proportional to a logarithm of the ratio of the sum of the assigned weights corresponding to the examples classified correctly by the optimized weak learner or the selected classifier and the sum of the assigned weights corresponding to the examples incorrectly classified by the optimized weak learner or the selected classifier;

(d) updating the loss parameters to the product of each with the exponential loss of the weak learner or classifier on its respective training example;
and
repeating the operations defined in clauses a through d until a stop criterion is met;

forming a linear combination of the optimized weak learners or the selected classifiers obtained from multiple iterations of operations a through d, each weighted by a respective one of the coefficients calculated in operation c; and outputting data representing said linear combination.

12. The apparatus of claim 11, the operations further comprising: exponentially adjusting each weight of each training example based on a scalar parameter that defines a relationship between a risk of each training example and the sample variance of each training example.

13. The apparatus of claim 11, wherein w represents each weight of each training example;
wherein n represents a number of the one or more weights of the one or more training examples;
wherein $\lambda$ represents the scalar parameter; and
wherein the non-linear function comprises a function, $u_i \leftarrow \lambda n w_i^2 + (1-\lambda) w_i$.

14. The apparatus of claim 11, the operations further comprising: adjusting each weight of each training example based on whether the classifier correctly classifies each training example; and iteratively repeating the optimizing, estimating, assigning the weight to the classifier, and the adding until a stopping criteria is met.

15. The apparatus of claim 11, the operations further comprising:
exponentially decreasing a weight of a training example when the classifier correctly classifies the training example; and
exponentially increasing a weight of a training example when the classifier incorrectly classifies the training example.

16. A non-transitory computer-readable medium having instructions stored thereon that, when executed by a processor, cause the process to perform operations, the operations comprising:
receiving one or more training examples representing classifiable events or objects including label data identifying respective classes of the events or objects, wherein each training example comprises one or more elements;

associating a respective loss parameter with each training example of the one or more training examples, a value of each respective loss parameter being initialized to an initial value;
(a) calculating a weight of each training example based on a sample variance of the training example using a non-linear function;
(b) optimizing a weak learner in a pool of weak learners or selecting a classifier from a pool of classifiers, to minimize an exponential loss of the weak learner or classifier on the one or more weighted training examples, without evaluating all the weak learners in the pool of weak learners and without evaluating all of the classifiers in the pool of classifiers;
(c) calculating a coefficient for the optimized weak learner or the selected classifier which is proportional to a logarithm of the ratio of the sum of the assigned weights corresponding to the examples classified correctly by the optimized weak learner or the selected classifier and the sum of the assigned weights corresponding to the examples incorrectly classified by the optimized weak learner or the selected classifier;
(d) updating the loss parameters to the product of each with the exponential loss of the weak learner or classifier on its respective training example;
repeating the operations defined in clauses a through d until a stop criterion is met;

forming a linear combination of the optimized weak learners or the selected classifiers obtained from multiple iterations of operations a through d, each weighted by a respective one of the coefficients calculated in operation c; and outputting data representing said linear combination.

17. The non-transitory computer-readable medium of claim 16, the operations further comprising:
exponentially adjusting each weight of each training example based on a scalar parameter that defines a relationship between a risk of each training example and the sample variance of each training example.

18. The non-transitory computer-readable medium of claim 16, the operations further comprising: adjusting each weight of each training example based on whether the classifier correctly classifies each training example; and iteratively repeating the optimizing, estimating, assigning the weight to the classifier, and the adding until a stopping criteria is met.

19. The non-transitory computer-readable medium of claim 16, the operations further comprising: exponentially decreasing a weight of a training example when the classifier correctly classifies the training example; and exponentially increasing a weight of a training example when the classifier incorrectly classifies the training example.

* * * * *